United States Patent [19]

Summers

[11] 4,112,492

[45] Sep. 5, 1978

[54] FUEL ECONOMY MEASURING CIRCUIT EMPLOYING RATE MULTIPLIER COMPONENTS

[76] Inventor: Gary J. Summers, 1454 Nesbit Ct., San Jose, Calif. 95120

[21] Appl. No.: 760,426

[22] Filed: Jan. 18, 1977

[51] Int. Cl.² ............................................ G01M 15/00
[52] U.S. Cl. ...................................... 364/442; 73/114; 235/61 J; 235/92 FL; 364/703
[58] Field of Search ........ 235/150.21, 92 FL, 92 MT, 235/61 J; 73/113, 114; 364/442, 703

[56] References Cited

U.S. PATENT DOCUMENTS

| | | | |
|---|---|---|---|
| 3,793,882 | 2/1974 | Holben | 73/113 |
| 3,927,305 | 12/1975 | Gruhl | 235/150.21 |
| 3,967,097 | 6/1976 | Moretti | 235/150.21 |
| 3,983,372 | 9/1976 | Klaver | 235/150.21 |
| 4,046,998 | 9/1977 | Kuno et al. | 364/442 |

Primary Examiner—Malcolm A. Morrison
Assistant Examiner—Errol A. Krass
Attorney, Agent, or Firm—Harry E. Aine; Harvey G. Lowhurst

[57] ABSTRACT

In a fuel economy measuring circuit a first train of pulses having a rate which is a function of the velocity of the vehicle or of the fuel consumption rate is fed into one input terminal of an up-down counter for causing the counter to count up or down as the case may be. A second train of pulses having a pulse rate which is a function of the fuel consumption of the vehicle per unit time or velocity of the vehicle is fed into one input of a rate multiplier for multiplication with the output of the up-down counter to derive a product output train of pulses having a pulse rate which is a function of the product of the output signal of the counter and the other input. The output pulse train of the rate multiplier is fed to the other input terminal of the up-down counter. The up-down counter serves as a null detector and the output of the up-down counter is proportional to the fuel economy either in distance per unit fuel quantity or fuel quantity per unit of distance of the vehicle (miles per gallon or gallons per mile). The output signal from the up-down counter is fed to a display for displaying to the operator the fuel economy measurement.

6 Claims, 1 Drawing Figure

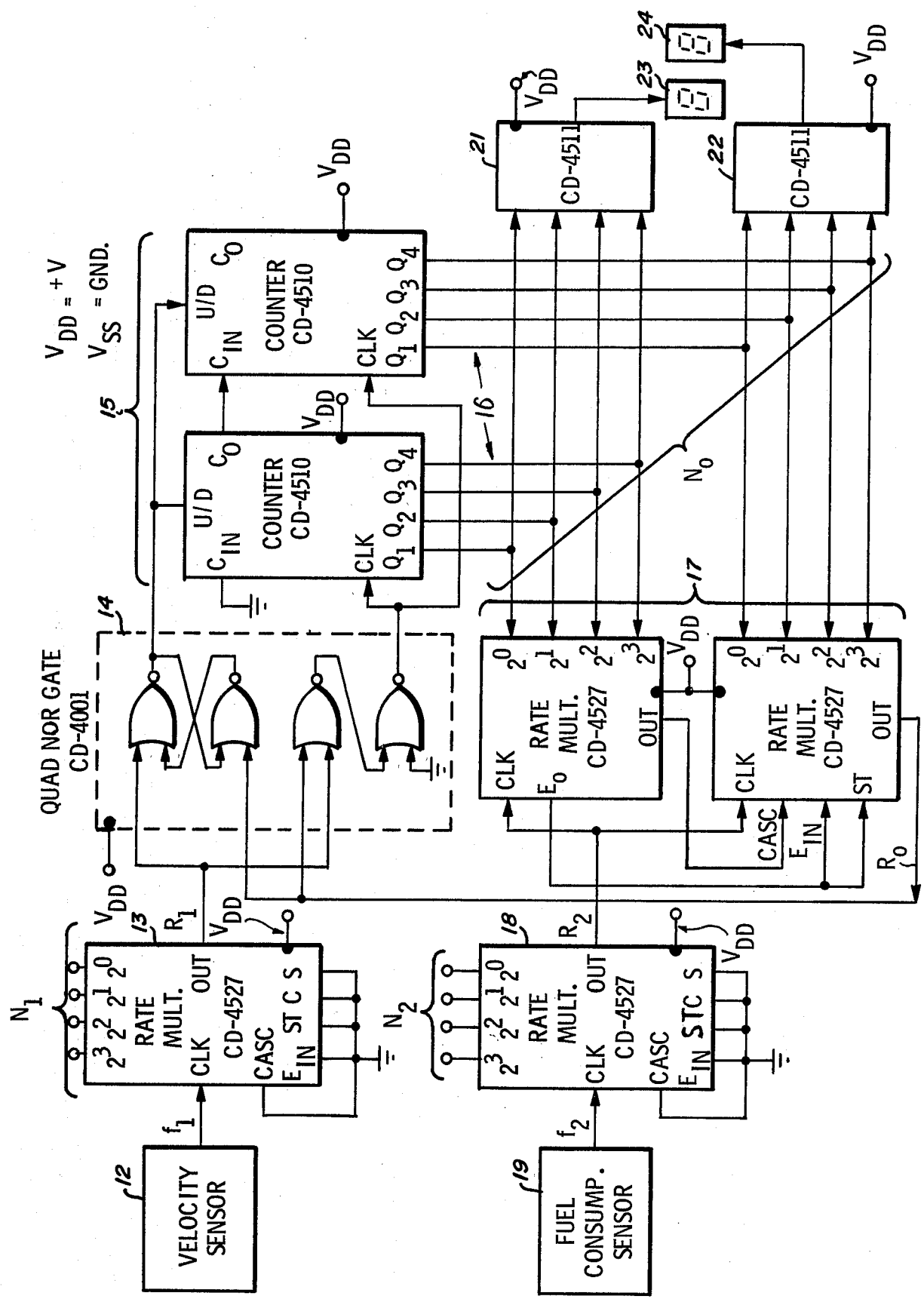

FUEL ECONOMY MEASURING CIRCUIT EMPLOYING RATE MULTIPLIER COMPONENTS

BACKGROUND OF THE INVENTION

The present invention relates in general to fuel economy circuits (to miles per gallon measuring circuits) and more particularly to an improved fuel economy measuring circuit employing digital techniques and integrated circuit components, particularly one or more rate multipliers.

DESCRIPTION OF THE PRIOR ART

Heretofore, a number of proposals for vehicle fuel economy calculator and indicator circuits have been made which use digital integrated circuitry for interfacing the fuel consumption and vehicle distance sensing devices with readout devices. Examples of such circuits include U.S. Pat. Nos. 3,967,097 issued June 29, 1976; 3,908,451 issued Sept. 30, 1975; and 3,983,372 issued Sept. 28, 1976. However, the implementation of these prior circuits has been relatively costly particularly for the do-it-yourself individual since the various different circuits required are relatively costly.

It is also known from the prior art to employ rate multipliers and counters in various process control circuitry. For example, U.S. Pat. No. 3,914,581 issued Oct. 21, 1975 involves the use of rate multipliers and up-down counters in a control circuit.

SUMMARY OF THE PRESENT INVENTION

The principal object of the present invention is the provision of an improved fuel economy measuring circuit and particularly one especially suited for automotive use and which can utilize large scale integrated circuit components which are readily available at relatively low cost and which are compatible for automotive use.

In one feature of the present invention, an up-down counter is employed as a null detector for nulling a first input count signal having a rate which is a function of the velocity of the vehicle or fuel consumption with a second input which is counted in the opposite direction and which is a function of the product of fuel consumption per unit time or velocity and the output of the counter which is proportional to the fuel economy in distance per unit of fuel or fuel per unit distance.

In another feature of the present invention the second input signal to the counter is derived from the output of a rate multiplier which multiplies the rate of a signal which is a function of the fuel consumption or velocity with the output of the counter to derive the output product signal which is thence fed to the counter.

In another feature of the present invention the output of the velocity sensor and the output of the fuel consumption sensor are fed to respective rate multipliers for multiplication therein with calibration quantities to derive trains of pulses having rates proportional to the velocity and fuel consumption, respectively, whereby interfacing of the measurement circuitry to the sensors is facilitated.

Other features and advantages of the present invention will become apparent upon a perusal of the following specification taken in connection with the accompanying drawing wherein:

BRIEF DESCRIPTION OF THE DRAWING

The drawing is a schematic circuit diagram, in block diagram form, of a fuel economy measuring circuit incorporating features of the present invention.

DESCRIPTION OF THE PREFERRED EMBODIMENTS

Referring to the drawing there is shown a fuel economy or distance per fuel quantity measuring circuit 11 incorporating features of the present invention. The circuit 11 includes a velocity sensor 12 which is placed in series with the speedometer cable of the vehicle, such a sensor is commercially available from Federal Sign and Signal Co., 136th St. and Western Ave., Blue Island, Ill. 60406. The output of the velocity sensor 12 is a train of pulses having a frequency proportional to the velocity in miles per hour of the vehicle.

The output of the velocity sensor 12, at a frequency $f_1$, is fed into the clock input of a rate multiplier 13 such as a CD-4527 commercially available from Fairchild Corporation of Mt. View, Calif. Such a rate multiplier 13 uses SSI CMOS circuits in a single medium scale integrated (MSI) design. The second input to the rate multiplier 13 is a binary (BCD) data signal $N_1$ to be utilized in calibrating the output of the measuring circuit 11. $N_1$ can have any value between one and nine and the output signal from the rate multiplier 13 comprises a train of pulses having a rate $R_1$ equal to $(f_1 \times N_1)/10$.

The output signal of the rate multiplier 13, at a rate $R_1$, is fed to one input of a quad NOR gate, such as Model CD-4001, to provide the proper timing of pulses which are thence fed as one input to the up-down count input terminals of a pair of cascaded up-down counters 15 to provide a two digit output signal $N_0$ of binary (BCD) form on output lines 16. The output lines 16 include four output lines providing the most significant bit in the output signal $N_0$ and a second set of four lines providing the least significant bit of the output signal $N_0$. The output signal $N_0$ is indicative of the fuel economy in miles per gallon of the vechicle.

Since the up-down counters 15 are employed as a null detector, the BCD output $N_0$ is fed into one input of a pair of cascaded rate multipliers 17 for multiplication against a second input $R_2$ derived from a third rate multiplier 18 which serves to interface a fuel consumption sensor 19 with the circuit 11. More particularly, the fuel consumption sensor 19 is, for example, a gas-flow sensor available from Flo Scan Instrument Co., 3016 N.E. Bleckly St., Seattle, Wash. 95105 and generates a train of pulses having a frequency $f_2$ which is a function of the fuel consumption in gallons per hour.

The output signal at $f_2$, derived from the fuel consumption sensor 19, is fed to the clock input of rate multiplier 18 for multiplication with a second calibration BCD input signal $N_2$ to derive the output signal $R_2$ which is equal to $(f_2 \times N_2)/10$ thence fed to the clock input terminals of the second rate multiplier circuit 17. The output $R_0$ of the second rate multiplier circuit 17 at a rate or frequency equal to the product of $R_2 \times N_0$ is fed to a second input of the NOR gate circuit 14. A second output of the NOR gate circuit 14 is fed to the clock input of the up-down counter circuit 15. In such a connection of the up-down counter 15, the up-down counter serves as a null detector and the counter 15 will either count up or down in such a way as to make the frequency of the two input signals $R_1$ and $R_0$ equal, i.e., $R_1 = R_0$.

The two output signals $N_0$ from the counters 15, are fed via BCD to seven segment latch decoder drivers 21 and 22, such as CD-4511 drivers available from Motorola Corporation, to the inputs of seven segment LED displays 23 and 24 for displaying to the operator and reading out to the operator the fuel economy to two places, for example, 1-99 MPG.

The two input BCD calibration signals $N_1$ and $N_2$ which are inputting to the rate multipliers 13 and 18, respectively, serve to calibrate the measuring circuit so that the velocity and fuel consumption sensors 12 and 19 are properly interfaced to the circuit and provide a correct output reading on LED displays 23 and 24. In addition, the two rate multipliers 13 and 18 serve to shape and form the pulses derived from the sensors and to assure that the input signals to the counter and rate multiplier 17, respectively, are buffered and interfaced through proper impedance matching.

The following equations show how the output $N_0$ is derived.

$$R_1 = f_1(N_1/10)$$

$$R_2 = f_2(N_2/10)$$

$$R_0 = f_2(N_2/10)(N_0/10)$$

at equilibrium $R_1 = R_0$ so $$f_1(N_1/10) = f_2(N_2/10)(N_0/10)$$

$$\frac{N_0}{10} = \frac{f_1 N_1/10}{f_2 N_2/10} = \frac{f_1}{f_2} K = \frac{miles/hr \; K}{gal/hr} = K \frac{miles}{gal}$$

where $K$ is a calibration constant.

In an alternative embodiment the inputs $f_1$ and $f_2$ are reversed and the output fuel economy signal $N_0$ is in units of gallons/mile. Also, if a conventional up-down counter of the type having separate up and down count input terminals is employed in place of counters 15, the NOR gate 14 can be eliminated and the outputs $R_1$ and $R_0$ fed separately to the two up-down count input terminals. Also, the inputs $R_1$ and $R_0$ need not be fed to any particular count input terminal of the counter 15 but may be reversed as to their input connections.

What is claimed is:

1. In a fuel economy measuring circuit:
   rate multiplier means responsive to an inputted first signal comprising a train of pulses at a first rate $R_2$ which is a function of the rate of consumption of fuel and to an inputted second signal $N_0$ which is a function of the output signal of the measuring circuit in distance per unit of fuel quantity to produce an output signal $R_0$ comprising a train of pulses at a rate corresponding to the product $R_2 N_0$ of said first and second inputted signals; and
   up-down counter means having input terminal means connected to receive a train of pulses having a rate $R_1$ which is a function of the velocity of the vehicle for counting in one direction and to receive said output train of pulses at the rate $R_0$ derived from the output of said rate multiplier for counting in the opposite direction, said up-down counter means being responsive to said inputted train of pulses to derive said output signal $N_0$ which is a measure of the fuel economy in distance per unit of fuel consumption of the vehicle.

2. The apparatus of claim 1 including second and third rate multiplier means one for receiving an input signal which is a function of and derived from a vechicle velocity sensor and the other for receiving an input signal which is a function of and derived from a vehicle fuel consumption sensor for buffering said received sensor signals and each of said second and third rate multiplier means being responsive to respective second and third constant calibration signals for introducing calibration components into their respective buffered outputs.

3. The apparatus of claim 1 including digital display means for displaying said output fuel economy signal $N_0$.

4. In a fuel economy measuring circuit:
   rate multiplier means responsive to an inputted first signal comprising a train of pulses at a first rate $R_2$ which is a function of the velocity of a vehicle and to an inputted second signal $N_0$ which is a function of the output signal of the measuring circuit in fuel quantity per unit of distance to produce an output signal $R_0$ comprising a train of pulses at a rate corresponding to the product $R_2 N_0$ of said first and second inputted signals:
   up-down counter means having input terminal means connected to receive a train of pulses having a rate $R_1$ which is a function of the rate of fuel consumption of the vechicle for counting in one direction and to receive said output train of pulses at the rate $R_0$ derived from the output of said rate multiplier for counting in the opposite direction, said up-down counter means being responsive to said inputted train of pulses to derive said output signal $N_0$ whcih is a measure of fuel consumption per unit of distance of the vehicle.

5. The apparatus of claim 4 including second and third rate multiplier means one for receiving an input signal which is a function of and derived from a vehicle velocity sensor and the other for receiving an input signal which is a function of and derived from a vehicle fuel consumption sensor respectively for buffering said received sensor signals and each of said second and third rate multiplier means being responsive to respective second and third constant calibration signals for introducing calibration components into their respective buffered outputs.

6. The apparatus of claim 4 including digital display means for displaying said output fuel economy signal $N_0$.

* * * * *